United States Patent
Lampert et al.

(10) Patent No.: US 9,703,669 B2
(45) Date of Patent: Jul. 11, 2017

(54) APPARATUS AND METHOD FOR DISTRIBUTED INSTRUCTION TRACE IN A PROCESSOR SYSTEM

(71) Applicant: Cavium, Inc., San Jose, CA (US)

(72) Inventors: Gerald Lampert, Hopkinton, MA (US); David Kravitz, Cambridge, MA (US); Bryan W. Chin, San Diego, CA (US)

(73) Assignee: CAVIUM, Inc., San Jose, CA (US)

( * ) Notice: Subject to any disclaimer, the term of this patent is extended or adjusted under 35 U.S.C. 154(b) by 141 days.

(21) Appl. No.: 14/541,841

(22) Filed: Nov. 14, 2014

(65) Prior Publication Data

US 2016/0140014 A1     May 19, 2016

(51) Int. Cl.
*G06F 11/34*     (2006.01)
*G06F 11/07*     (2006.01)
*G06F 11/30*     (2006.01)

(52) U.S. Cl.
CPC ........ *G06F 11/3495* (2013.01); *G06F 11/079* (2013.01); *G06F 11/0751* (2013.01); *G06F 11/0781* (2013.01); *G06F 11/3024* (2013.01); *G06F 11/3072* (2013.01); *G06F 11/348* (2013.01); *G06F 11/3452* (2013.01); *G06F 11/3471* (2013.01)

(58) Field of Classification Search
CPC ............. G06F 11/0778; G06F 11/0751; G06F 11/0709; G06F 11/0712; G06F 11/0787; G06F 11/079; G06F 11/0793; G06F 11/0715; G06F 11/0766; G06F 11/3692; G06F 11/3065; G06F 11/3476
See application file for complete search history.

(56) References Cited

U.S. PATENT DOCUMENTS

| | | | | |
|---|---|---|---|---|
| 6,584,491 B1 * | 6/2003 | Niemi | ................ | G06F 11/3476 709/202 |
| 7,080,283 B1 * | 7/2006 | Songer | ................ | G06F 11/3636 714/30 |
| 7,506,314 B2 * | 3/2009 | Kollmann | ........... | G06F 11/3476 714/45 |
| 7,636,870 B2 * | 12/2009 | Ueno | ................ | G06F 11/3636 714/30 |
| 7,707,394 B2 * | 4/2010 | Ashfield | ............... | G06F 9/3804 712/227 |
| 8,141,051 B2 * | 3/2012 | Huang | ................ | G06F 11/3409 717/127 |

(Continued)

*Primary Examiner* — Nadeem Iqbal
(74) *Attorney, Agent, or Firm* — pkalousek.ip

(57) ABSTRACT

One disclosed embodiment provides an integrated circuit that has a plurality of processors and a plurality of processor trace collection logic units. Each processor trace collection logic unit corresponds with, and is operatively coupled to, one of the processors. A separate filtering logic unit is operatively coupled to the plurality of processor trace collection logic units. In some embodiments of the integrated circuit, each processor trace collection logic unit is operative to continuously collect processor trace information from a corresponding operatively coupled processor. Each filtering logic unit is operative to monitor the continuous processor trace information for occurrence of a predetermined condition, and to store some of the processor trace information to memory in response to occurrence of that condition.

19 Claims, 3 Drawing Sheets

(56) References Cited

U.S. PATENT DOCUMENTS

| | | | |
|---|---|---|---|
| 8,521,765 B2* | 8/2013 | George | G06F 17/30979 707/706 |
| 2007/0294592 A1* | 12/2007 | Ashfield | G06F 9/3804 714/45 |
| 2008/0162272 A1* | 7/2008 | Huang | G06F 11/3409 717/127 |
| 2012/0226804 A1* | 9/2012 | Raja | H04L 43/028 709/224 |

\* cited by examiner

- PRIOR ART -

- PRIOR ART -

APPARATUS AND METHOD FOR DISTRIBUTED INSTRUCTION TRACE IN A PROCESSOR SYSTEM

FIELD OF THE DISCLOSURE

The present disclosure relates generally to processor architecture and more particularly to apparatuses and methods for processor debugging and performance monitoring.

BACKGROUND

A processor trace consists of information that is collected as a processor executes a program. A processor trace may provide a record of which instructions were executed, in what order they were executed, the speed at which they were executed and other aspects pertaining to a program's execution. In order to provide trace support in hardware, a typical processor may have one or more processor trace units as shown in FIG. 1.

In FIG. 1, an integrated circuit 100 (also referred to as a "chip") is a multi-core processor chip that includes processors 101 that are each operatively coupled to corresponding trace logic units 103. Any number of processor/trace unit complexes may be implemented. The trace logic units 103 store the trace information to either a memory buffer such as main memory 105, or to a dedicated trace memory that may be either on chip or off chip, or to external trace port 107 which may be connected to an external trace capture unit (not shown). Each trace logic unit 103 is closely coupled with its corresponding processor 101 and examines signals from within that processor to determine the sequence of instructions being executed on that processor. Some details of a trace logic unit are shown in FIG. 2. The trace logic unit 200 has 3 major functions that include trace collection logic 201, trace filtering logic 203 and trace formatting logic 205.

The trace collection logic 201 monitors signals from the processor and records state information to be conveyed in the trace. State information includes, for example, completed instruction program counters, the address of load and store accesses to memory and other information that may be useful in the trace. The filtering logic 203 turns the trace on and off according to user defined parameters (i.e. filters). For example, a filter may specify that a trace should be turned on as soon as an exception handler is entered and turned off as soon as an exception handler completes. The filtering mechanism may be complex, consisting of a sequence of state dependent actions that result in the trace being turned on or off (e.g. wait for a particular program counter, followed by a load to a particular address, and then capture 100 instructions of trace information). In addition, the filtering mechanism can specify that the user only wants certain events, or types of instructions, to appear in the trace. For example, the user may specify that the trace should only contain data and instructions related to load or store operations.

The formatting logic 205 addresses, among other things, redundant information that may be contained in the collected trace information. That is, in order to efficiently store the trace information into either the main memory 105 or the external trace port 107, redundant information should be removed to conserve both space and bandwidth. Formatting operations may be lossless or lossy, depending on the use case.

The circuits required to implement trace logic units 103, having the three functions of collection, filtering and formatting, may be a non-trivial percentage of the total circuits required to implement the processor. More particularly, when the number of processors is large, the circuit overhead of the corresponding trace logic units may be beyond practical implementation. In addition, limited bandwidth and space is typically allotted to trace data such that it is impractical to generate a large number of traces simultaneously. Therefore only a subset of the trace logic units may be active at any given time.

DETAILED DESCRIPTION

Figure 1:
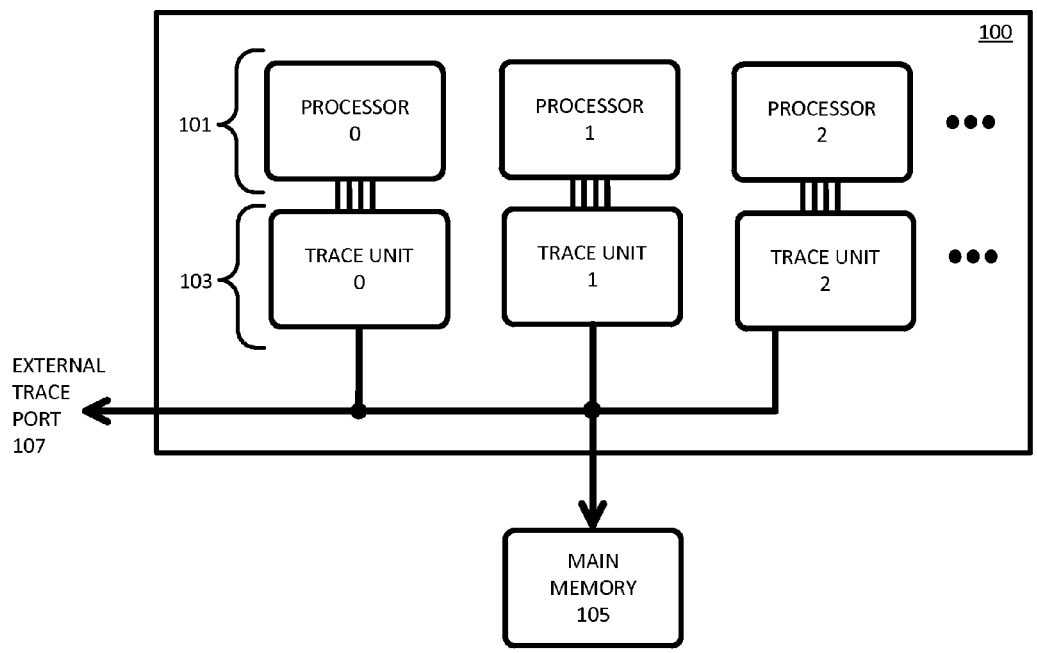
FIG. 1 is a block diagram of processor hardware providing process trace support in known systems.
Figure 2:
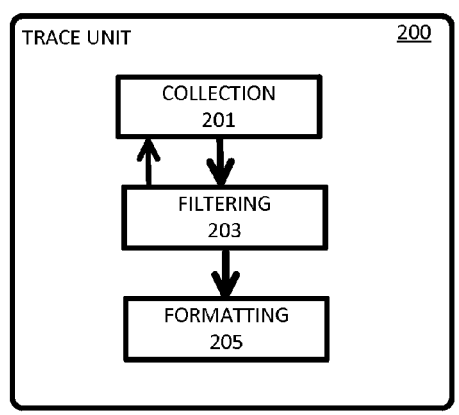
FIG. 2 is a block diagram showing details of a trace unit in the known system of FIG. 1.

The present disclosure provides apparatuses and methods of operation for implementing distributed instruction trace in a processor system. Among other advantages, the disclosed apparatuses and methods enable collection of processor trace information simultaneously from multiple processors in systems having a large number of processors.

One disclosed embodiment provides an integrated circuit that has a plurality of processors and a plurality of processor trace collection logic units. Each processor trace collection logic unit corresponds with, and is operatively coupled to, one of the processors. A separate filtering logic unit is operatively coupled to the plurality of processor trace collection logic units. In some embodiments of the integrated circuit, each processor trace collection logic unit is operative to continuously collect processor trace information from a corresponding operatively coupled processor. Each filtering logic unit is operative to monitor the continuous processor trace information for occurrence of a predetermined condition, and to store some of the processor trace information to memory in response to occurrence of that condition.

In some embodiments, each filtering logic unit is operative to receive program counter value updates from at least one processor trace collection logic unit, and to update a local copy of the program counter value based on a known instruction size and a given number of sequential instructions executed. Additionally, the filtering logic units may also update a local copy of the program counter value by incrementing the local copy program value using a program counter difference value received from the at least one processor trace collection logic unit. These program counter differences may be due to periodic updates from a trace collection logic unit of sequentially executing code, and/or program flow changes. Data compression of the processor trace information, including the program counter values may be utilized in the various embodiments.

In some embodiments, the integrated circuit includes non-transitory memory, operatively coupled to each filtering logic unit. Each filtering logic unit is operative to store processor trace collection information to the memory in response to detecting occurrence of a predetermined condition in the processor trace information.

Another disclosed embodiment provides an integrated circuit that includes a plurality of processors and a plurality of processor trace collection logic units. Each processor trace collection logic unit corresponds to, and is operatively coupled to, one of the processors. A plurality of filtering logic units are each operatively coupled to at least two processor trace collection logic units. The number of filtering logic units corresponds to a number of simultaneous traces supported for the integrated circuit.

In some embodiments, each processor trace collection logic unit is operative to continuously collect processor trace information from a corresponding operatively coupled processor. In some particular embodiments, the integrated circuit includes forty-eight processors and eight filtering logic units, where each filtering logic unit is operatively coupled to six processors.

The present disclosure also provides methods of operating an integrated circuit. In one embodiment, a method includes collecting processor trace information continuously from a plurality of processors by a corresponding plurality of processor trace collection logic units where each processor trace collection logic unit is dedicated to one processor of the plurality of processors; broadcasting, by each of a plurality of processor trace collection logic units, processor trace information to a plurality of filtering logic units, where the number of filtering logic units is less than the number of processor trace collection logic units; and storing some of the trace information to memory by at least one of the filtering logic units in response to occurrence of a predetermined condition detected by the filtering logic unit.

The present disclosure also provides a non-volatile, non-transitory computer readable memory that stores executable instructions such that when the instructions are executed by at least one processor of an integrated circuit fabrication system, the integrated circuit fabrication system will provide an individual trace collection logic unit for each processor of a plurality of processors, and will provide a filtering and formatting logic unit, operatively coupled to at least two of the trace collection logic units.

Figure 3:
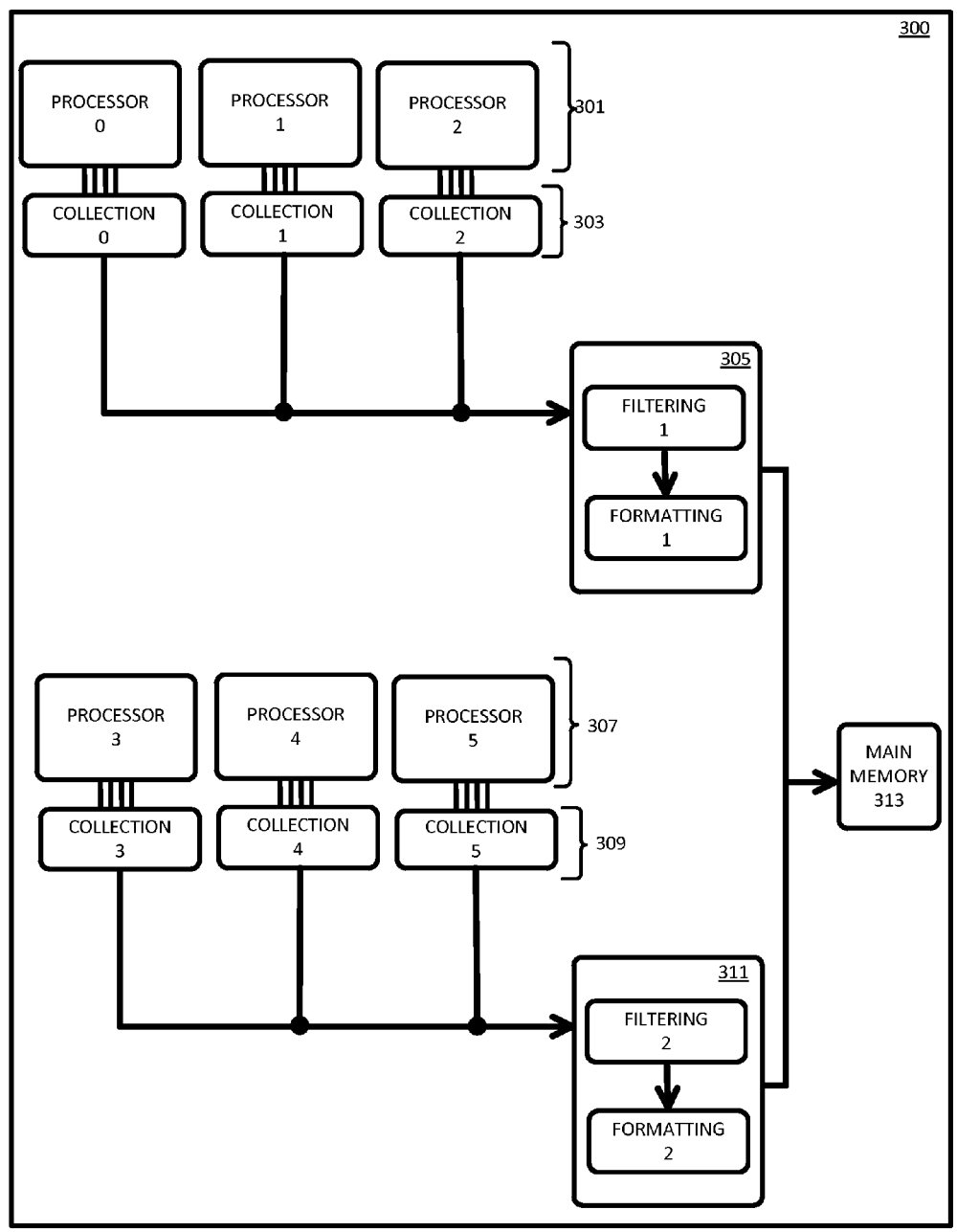
FIG. 3 is a block diagram of processor hardware providing process trace support on a multi-core processor integrated circuit in accordance with an example embodiment.

Turning now to FIG. 3 of the drawings, an example integrated circuit 300 in accordance with an embodiment is illustrated. In accordance with the example embodiment, trace logic is partitioned into two parts; collection logic units, and filtering and formatting logic units. The integrated circuit 300 includes a first group of processors 301 and a first group of collection logic units 303 such that each processor has a corresponding, operatively coupled collection logic unit. Thus "processor 0" is operatively coupled to "collection logic unit 0," "processor 1" is operatively coupled to "collection logic unit 1," "processor 2" is operatively coupled to "collection logic unit 2," etc. Likewise, a second group of processors 307 (with processors 3 through 5) has a second group of collection logic units 309 (with corresponding collection logic units 3 through 5) also such that each processor has a corresponding, operatively coupled collection logic unit.

A first filtering and formatting logic unit 305 (with "filtering logic 1" and "formatting logic 1") is operatively coupled to the first group of collection logic units 303 and a second filtering and formatting logic unit 311 (with "filtering logic 2" and "formatting logic 2") is operatively coupled to the second group of collection logic units 309. Both the first filtering and formatting logic unit 305 and the second filtering and formatting logic unit 311 are operatively coupled to main memory 313 and may store trace information therein. The filtering and formatting logic units 305, 311 are also referred to herein as "filtering logic units." The first filtering and formatting logic unit 305 and the second filtering and formatting logic unit 311 operate in the same manner and are referred to interchangeably in the present disclosure for convenience of describing various features and operations performed. In other words, features and operations described with respect to one of the filtering and formatting logic units will also apply to features and operations of the other. In the example embodiment shown in FIG. 3, the main memory 313 is located on the integrated circuit 300 however the main memory 313 may be located off-chip in some embodiments. The filtering and formatting logic units 305, 311 may also be alternatively, or additionally, operatively coupled to an external trace port (not shown) such that trace information may be stored to an external device.

In accordance with the embodiments, the number of filtering and formatting logic units is reduced to a number of instances that matches the maximum number of simultaneous traces that are practical to support. In one specific example implementation having forty-eight processors, where the maximum number of simultaneous traces to be supported is eight, the implementation may have forty-eight trace collection logic units, and eight filtering and formatting logic units. In this example, each filtering and formatting logic unit is operatively coupled to six of the trace collection logic units. In FIG. 3, where the example integrated circuit 300 has six processors and six corresponding trace collection logic units, two simultaneous traces are supported by the first filtering and formatting logic unit 305 and the second filtering and formatting logic unit 311. Therefore it is to be understood that in the various embodiments, a filtering and formatting logic unit may be operatively coupled to two or more trace collection logic units. Thus it is to be understood that in the various embodiments, the number of filtering and formatting logic units may correspond to the number of simultaneous traces supported by the implementation. The example integrated circuit 300 is therefore one example arrangement of trace collection logic units and filtering and formatting logic units and other arrangements may be employed in accordance with the embodiments. For example, another implementation of a six processor integrated circuit may support three simultaneous traces by having three filtering and formatting logic units with each filtering and formatting logic unit operatively coupled to two trace collection logic units, etc. Each filtering and formatting logic unit includes filtering logic and formatting logic as shown in FIG. 3.

The collection logic units 303, 309 are responsible for gathering trace information from their respective processors 301, 307, and conveying that information to the appropriate filtering and formatting logic unit 305, 311. The filtering logic of the filtering and formatting logic units 305, 311 operate active filters that turn trace on and off. Thus, in some embodiments, the collection logic units 303, 309 operate to deliver continuous trace information to their corresponding filtering and formatting logic unit 305, 311 without regard to whether the filtering logic will actually send the trace information to be stored (trace is on) or not (trace is off). In other words the collection logic units 303, 309 do not have any knowledge of when trace is on or off, except at a coarse trace-enabled level.

As an example, if program counters are being traced, the program counter of every instruction completed by the processor needs to be conveyed to the filtering logic of the filtering and formatting logic units 305, 311. The filtering logic may compare this stream of program counters to a preprogrammed condition to determine whether to store the trace or not. However, sending each program counter explicitly to the filtering and formatting logic units 305, 311 can consume a significant amount of bandwidth. For example, if a processor is averaging two-billion instructions per second, then a program counter value of about 64 bits has to be conveyed every cycle. This would require 128 Gbits/sec of bandwidth.

However, there is a strong correlation between successive program counter ("PC") values in most programs and this can be used advantageously in the various embodiments. For example, unless an instruction incurs a control change (e.g. branch, jump, exception, interrupt), an instruction's address is always the address of the previous instruction plus the size of the previous instruction. In common RISC architectures, instructions are all a fixed size (e.g. 4 bytes). Thus, except for control flow change instructions and events like interrupts and exceptions, the address of two successive instructions A and B is PC(A) and PC(B) where PC(B)=PC(A)+4. In other words, the program counter may be incremented by the instruction size when the instruction size is known.

Thus in this example, a collection logic unit sends a signal to the filtering and formatting logic unit indicating that the program counter of the current instruction being traced is the program counter of the last instruction traced plus four bytes. The filtering and formatting logic unit maintains a copy of the last known program counter and increments the program counter by four to recreate the value for the current traced instruction. In other embodiments, a collection logic unit may send less frequent updates to the program counter in the filtering and formatting logic unit. For example, an update from the collection logic unit might indicate that the program counter has executed eight instructions since the last update and the filtering and formatting logic unit's copy of the program counter should be adjusted accordingly. That is, in the present example, the program counter is adjusted by 32 for four byte instructions. In such an embodiment, the filtering and formatting logic must apply the filter conditions as if each of the intermediate program counters had been presented to the filters.

Figure 4:
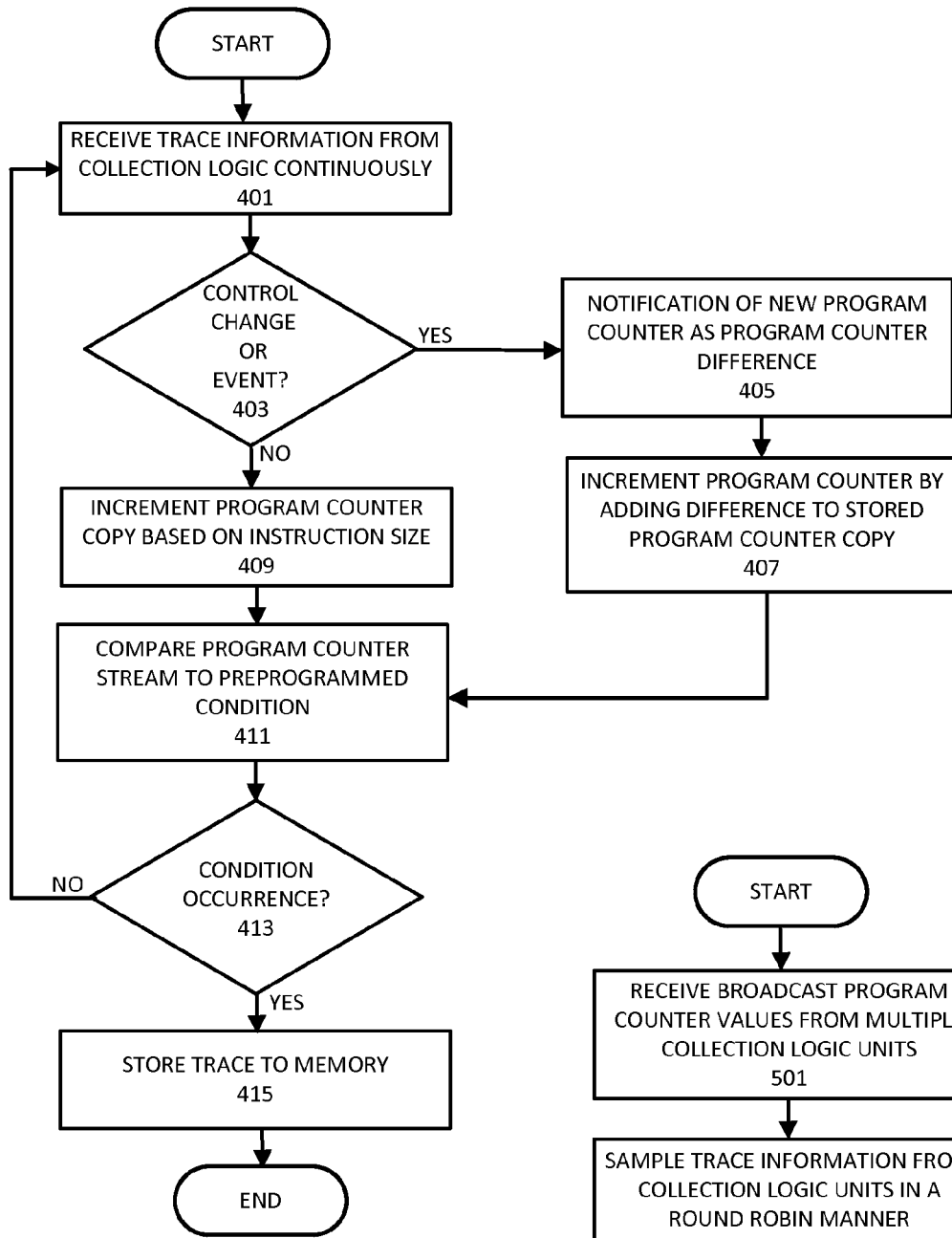
FIG. 4 is a flow chart of an example method of operation of filtering and formatting logic in accordance with an embodiment.

FIG. 4 illustrates an example method of operation of the filtering and formatting logic units 305, 311 in which they maintain a copy of the program counter according to the example above. At operation 401, each of the filtering and formatting logic units 305, 311 receive trace information continuously from at least one collection logic unit of the corresponding group of collection logic units 303, 309. For example filtering and formatting logic units 305 may receive trace information continuously from collection logic unit 0 of the collection and logic units 303, etc. In the event of control flow changes, the filtering and formatting logic unit 305 must be notified of the new program counter for processor 0. Thus if a control change or event occurs at decision 403, a notification may be accomplished by encoding the new value of the program counter relative to the old value of the program counter. That is, if the new instruction is at PC(B) and the previous instruction was at PC(A), then the collection logic unit 0 can send the difference (PC(B)-PC(A)) to the filtering and formatting logic unit 305 as shown at operation 405. At operation 407, the filtering and formatting logic unit 305 adds this difference to its copy of the previous program counter (i.e. "PC(A)") to update its copy of the program counter to PC(B). In some embodiments, this scheme can be further improved by using known compression techniques, such as Huffman encoding, or variants of known compression algorithms such as Lempel-Ziv. In other words, the various embodiments may employ various techniques to reduce the bandwidth required to send program counter updates from the collection logic units to the filtering and formatting logic units.

It is to be understood that, in accordance with the embodiments, similar techniques of sending differences in values to program counters can be applied to other values as well. For example, in some instruction sets, a register is used as the base address for a load or a store and that base address is incremented or decremented after each load or store. Often these loads and stores appear in a sequence, such as when indexing sequentially through an array or copying from one block of memory to another block of memory. The increment or decrement amount can be sent to a copy of that address in the filtering and formatting logic units, obviating the need to send the entire address for each load or store.

Returning to decision 403, if no control change or event has occurred, then the filtering and formatting logic unit 305 may increment its copy of the program counter based on the known instruction size at operation 409 as was discussed with respect to examples above. After incrementing its copy of the program counter at either operation 407 or operation 409, the filtering and formatting logic unit 305 proceeds to operation 411 and may compare the program counter stream to a preprogrammed condition. If the required condition occurs at decision 413, then the filtering and formatting logic unit 305 may store the trace to main memory 313 at operation 415 (i.e. trace on). If no required condition is met at decision 413, then the filtering and formatting logic unit 305 continues to receive trace information from the collection logic unit at operation 401 etc. The method of operation may halt temporarily during sleep mode operations of the corresponding processor or may terminate at power down of a given processor. Also, in some cases, instead of receiving updates from the collection logic unit on every sequential change (e.g. PC+4), the filtering and formatting logic unit 305 might receive an update for a multitude of sequential instructions of a known size. In this case, for each program counter increment included in the program counter update operation described in 409, the condition in operation 411 is applied to each intermediate program counter value represented by the update from the collection logic unit.

Figure 5:
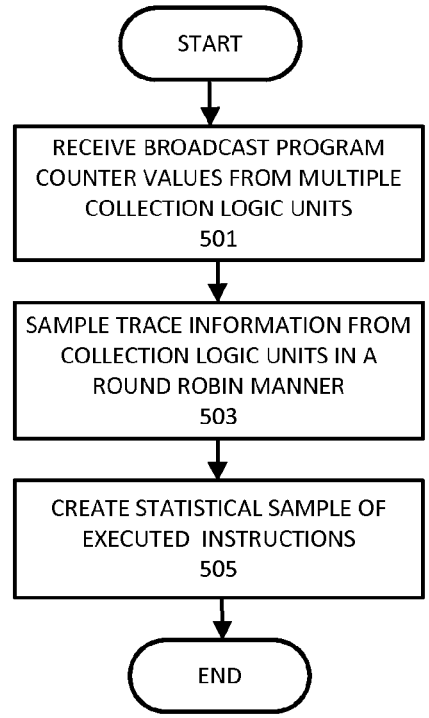
FIG. 5 is a flow chart of an example method of operation of filtering and formatting logic in accordance with another embodiment.

FIG. 5 illustrates an example method of operation of the filtering and formatting logic units 305, 311 for a statistical multi-trace mode as opposed to single trace operation. That is, in a statistical multi-trace mode, the filtering and formatting logic units 305, 311 may selectively sample traces from any number of collection logic units under software or hardware control. In embodiments that utilize software control, the filtering and formatting logic unit is programmable to select a trace to follow (i.e. a corresponding processor and collection logic unit), and apply its filters to that trace. In embodiments that utilize hardware control, the filtering and formatting logic unit is operative to sample from two or more of the collection logic units, for example, in a round-robin fashion to create a statistical sampling of instructions executed by the corresponding operatively coupled processors. In this mode, the collection logic units continuously broadcast program counter values which are then statistically sampled by the filtering and formatting logic unit. Further in some embodiments, the program counter values may be broadcast as differences between the previous program counter value, and may also be compressed in accordance with the single trace example embodiments discussed above. In some embodiments, the filtering and formatting logic units may select which of its operatively coupled trace collection logic units broadcast their program counters at a given time. In other embodiments, the trace collection logic units may attach a unique identifier to their broadcast program counter values such that the filtering and formatting logic units can distinguish between broadcast values or program counter update values from different trace collection logic units. In yet other embodiments, a group of trace collection logic units, such as trace collection logic units 303, may have dedicated physical or logical buses (for example, a time-division multiplexed bus) to their corresponding filtering and formatting logic unit 305, thereby enabling the filtering and formatting logic unit 305 to distinguish between data from different trace collection logic units 303 based on the physical or logical bus used for the data transmission.

Thus at operation 501, the filtering and formatting logic unit receives broadcast program counter values from multiple collection logic units. At operation 503, the filtering and formatting logic unit samples trace information from the multiple collection logic units in a round robin manner, and creates a statistical sample of executed instructions at operation 505. The statistical sample is stored in main memory 313. In this case, the filtering and formatting logic unit maintains a copy of the program counter for each operatively coupled collection logic unit. For example, in FIG. 3, the filtering and formatting unit 305 will maintain a local copy of the program counter for collection logic unit 0, collection logic unit 1 and collection logic unit 2. Likewise, filtering and formatting logic unit 311 will maintain a local copy of the program counter for collection logic unit 3, collection logic unit 4 and collection logic unit 5. Alternatively, the trace collection logic units 303 may broadcast the program counter for each sample, obviating the need for the filtering and formatting logic unit 305 to keep track of the last reported program counter from each trace collection logic unit 303.

As described above, in other modes of operation, the filtering and formatting logic units 305, 311 can monitor the program counter values and program counter value changes from one collection logic unit at a time. The filtering and formatting logic units 305, 311 each maintain a local copy of the program counter (or other event type, such as load or store address, or store data) and apply this copy to their respective filtering logic (i.e. filtering logic 1 and filtering logic 2). The filtering logic may be programmed by software to look for particular events and cause the trace to either start or stop as discussed at decision 403 in FIG. 4.

Therefore, in the various embodiments, collection logic units and filtering and formatting logic units are segregated such that the filtering and formatting logic units maintain their own copy of the program counter value. The collection logic units may always send data to the filtering and formatting logic units without regard to whether the filtering and formatting logic units have triggered a start or stop trace event. However, the various embodiments disclosed do not preclude the use of a flow control signal or other back pressure mechanism from the filtering and formatting logic units to the collection logic units (such as a credit scheme) from starting or stopping the trace.

The various embodiments described herein include a non-volatile, non-transitory computer readable medium such as, but not limited to, a server memory, CD, DVD, or other non-volatile, non-transitory memory that stores code (i.e. executable instructions) that may be executed by one or more processors of a manufacturing process. As such, an integrated circuit having the components, logic, etc. described herein may be manufactured by processing such code, examples of which include, but are not limited to, hardware description language (HDL) instructions and/or data, a Netlist, or some other descriptive language used in an electronic design automation (EDA) system such as an integrated circuit fabrication system. Thus one or more processors of a manufacturing system may execute such executable instructions by reading the computer readable medium to setup manufacturing of an integrated circuit having the features and functions, and being able to perform the methods of operation, of the various embodiments herein described.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. An integrated circuit comprising:
a plurality of processors;
a plurality of processor trace collection logic units, each processor trace collection logic unit corresponding and operatively coupled to one of the processors; and
a plurality of filtering logic unit corresponding to a number of simultaneous traces supported in the integrated circuit, wherein:
at least one filtering logic unit is operatively coupled to more than one of the plurality of processor trace collection logic units; and
each of the plurality of filtering logic unit is configured to turn on or off storing a processor trace information collected by one of the operatively coupled collection logic unit(s).

2. The integrated circuit of claim 1, where each processor trace collection logic unit is operative to continuously collect processor trace information from a corresponding operatively coupled processor.

3. The integrated circuit of claim 2, where the filtering logic unit is operative to:
monitor the processor trace information for occurrence of a predetermined condition; and
store some of the processor trace information to memory in response to occurrence of the predetermined condition.

4. The integrated circuit of claim 2, where the filtering logic unit is operative to:
receive a program counter value updates from at least one processor trace collection logic unit; and
update a local program counter copy based on the program counter value updates and a known instruction size.

5. The integrated circuit of claim 4, where the filtering logic unit is further operative to:
receive the program counter value updates including an indication of a number of sequentially executed instructions; and
update the local program counter copy based on the number of sequentially executed instructions and the known instruction size.

6. The integrated circuit of claim 2, where the filtering logic unit is operative to:
receive a program counter value updates from at least one processor trace collection logic unit; and
update a local a local program counter copy by incrementing the local program counter copy value using a program counter difference value received from the at least one processor trace collection logic unit.

7. The integrated circuit of claim 4, where the filtering logic unit is operative to:
receive the program counter value updates as compressed data that is compressed by the at least one processor trace collection logic unit; and
decompress the compressed data prior to updating the local program counter copy.

8. The integrated circuit of claim 2, further comprising:
non-transitory memory, operatively coupled to the filtering logic unit; and
where the filtering logic unit is operative to store processor trace collection information to the memory in response to detecting occurrence of a predetermined condition in the processor trace information.

9. An integrated circuit comprising:
a plurality of processors;
a plurality of processor trace collection logic units, each processor trace collection logic unit corresponding and operatively coupled to one of the processors; and
a plurality of filtering logic units, each filtering logic unit operatively coupled to at least two processor trace collection logic units, the number of filtering logic units corresponding to a number of simultaneous traces supported in the integrated circuit.

10. The integrated circuit of claim 9, where each processor trace collection logic unit is operative to continuously collect processor trace information from a corresponding operatively coupled processor.

11. The integrated circuit of claim 10, where the plurality of processors comprises forty-eight processors and the plurality of filtering logic units comprises eight filtering logic units, further where each filtering logic unit is operatively coupled to six processors.

12. A method of operating an integrated circuit comprising:
collecting processor trace information continuously from a plurality of processors by a corresponding plurality of processor trace collection logic units where each processor trace collection logic unit is dedicated to one processor of the plurality of processors;
broadcasting, by each of a plurality of processor trace collection logic units, processor trace information to a plurality of filtering logic units, the number of filtering logic units being less than the number of processor trace collection logic units; and
storing some of the trace information to memory by at least one of the filtering logic units in response to occurrence of a predetermined condition detected by the at least one filtering logic unit.

13. The method of claim 12, further comprising:
receiving, by each filtering logic unit, a program counter value updates from at least one processor trace collection logic unit; and
updating, by each filtering logic unit, a local copy of the program counter value based on a known instruction size.

14. The method of claim 13, further comprising:
receiving, by each filtering logic unit, the program counter value updates including an indication of a number of sequentially executed instructions; and
updating, by each filtering logic unit, the local copy of the program counter value based on the number of sequentially executed instructions and the known instruction size.

15. The method of claim 12, further comprising:
receiving, by each filtering logic unit, a program counter value updates from at least one processor trace collection logic unit; and
updating, by each filtering logic unit, a local copy of the program counter value by incrementing the local copy program value using a program counter difference value received from the at least one processor trace collection logic unit.

16. The method of claim 13, further comprising:
receiving, by each filtering logic unit, the program counter value updates as compressed data that is compressed by the at least one processor trace collection logic unit; and
decompressing, by each filtering logic unit, the compressed data prior to updating the local copy of the program counter value.

17. The method of claim 13, further comprising:
storing, by each filtering logic unit, processor trace collection information to memory in response to detecting occurrence of a predetermined condition in the processor trace information.

18. A non-volatile, non-transitory computer readable storage medium comprising:
executable instructions that when executed by at least one processor of an integrated circuit fabrication system cause the integrated circuit fabrication system to:
provide an individual trace collection logic unit for each processor of a plurality of processors; and
provide a plurality of filtering and formatting logic units, each filtering logic unit operatively coupled to at least two trace collection logic units, the number of filtering logic units corresponding to a number of simultaneous traces supported in the integrated circuit.

19. The non-volatile, non-transitory computer readable storage medium of claim 18, wherein the executable instructions, when executed by at least one processor of the integrated circuit fabrication system, further cause the integrated circuit fabrication system to:
provide a memory unit, operatively coupled to each of the filtering and formatting logic units.

* * * * *